(12) United States Patent
Frey et al.

(10) Patent No.: US 7,686,563 B2
(45) Date of Patent: Mar. 30, 2010

(54) COUPLING APPARATUS FOR RELEASABLY COUPLING HYDRAULICALLY POWERED WORK IMPLEMENTS TO A WORK VEHICLE

(75) Inventors: Oscar Frey, Listowel (CA); Ryan Frey, Listowel (CA)

(73) Assignee: 1708828 Ontario Ltd. o/a Horst Welding, Listowel, Ontario (CA)

( * ) Notice: Subject to any disclaimer, the term of this patent is extended or adjusted under 35 U.S.C. 154(b) by 100 days.

(21) Appl. No.: 11/844,039

(22) Filed: Aug. 23, 2007

(65) Prior Publication Data

US 2009/0051163 A1 Feb. 26, 2009

(51) Int. Cl.
*E02F 9/00* (2006.01)

(52) U.S. Cl. .......................................... 414/723; 37/468

(58) Field of Classification Search ................. 414/723; 37/468; 91/432; 901/29
See application file for complete search history.

(56) References Cited

U.S. PATENT DOCUMENTS

| | | | |
|---|---|---|---|
| 3,243,066 A * | 3/1966 | Gardner et al. ............... | 414/698 |
| 4,506,863 A | 3/1985 | Quin et al. | |
| 4,793,053 A | 12/1988 | Zuccaro et al. | |
| 4,938,651 A | 7/1990 | Gilmor et al. | |
| 5,002,444 A | 3/1991 | Chomel | |
| 5,049,027 A * | 9/1991 | Morrison et al. ............. | 414/723 |
| 5,108,252 A | 4/1992 | Gilmore, Jr. et al. | |
| 5,141,386 A | 8/1992 | Barwise | |
| 5,316,347 A | 5/1994 | Arosio | |
| 5,465,513 A | 11/1995 | Sonerud | |
| 5,802,753 A * | 9/1998 | Raunisto ...................... | 37/468 |
| 5,829,337 A | 11/1998 | Barden | |
| 6,196,265 B1 | 3/2001 | Horton et al. | |
| 6,230,740 B1 | 5/2001 | Horton et al. | |
| 6,405,815 B1 | 6/2002 | Stoever et al. | |
| 6,428,265 B1 | 8/2002 | Gilmore, Jr. | |
| 6,718,663 B1 | 4/2004 | Geraghty | |
| 6,813,851 B2 | 11/2004 | Mieger et al. | |
| 7,290,977 B2 * | 11/2007 | Albright et al. ............. | 414/723 |
| 2006/0120848 A1 | 6/2006 | Guhr | |

* cited by examiner

*Primary Examiner*—Donald Underwood
(74) *Attorney, Agent, or Firm*—Bereskin & Parr LLP/S.E.N.C.R.L., s.r.l.

(57) ABSTRACT

A coupling apparatus for releasably coupling a hydraulically activated work implement to a work vehicle includes an implement attachment device for attaching a work implement to a work vehicle, a first coupling assembly, and a second coupling assembly. The implement attachment device includes a forward side for facing the work implement and a rearward side for facing the work vehicle, first mounting members extending from the rearward side for mounting the implement attachment device to at least one boom arm of the work vehicle, and second mounting members for mounting the implement attachment device to the work implement. The first hydraulic coupling assembly extends from the rearward side, and includes a first coupler configured for fluid communication with a hydraulic power source on the work vehicle. The second hydraulic coupling assembly is mountable to the work implement, and includes a second coupler configured for fluid communication with a hydraulic system of the work implement, the second coupler being shaped and configured for engaging the first coupler. The first coupler is movable between a retracted position and an extended position so as to selectively engage the first coupler with the second coupler when the work implement is attached to the implement attachment device and the second hydraulic coupling assembly is mounted to the work implement, for placing the hydraulic system of the work implement in fluid communication with the hydraulic power source.

15 Claims, 12 Drawing Sheets

COUPLING APPARATUS FOR RELEASABLY COUPLING HYDRAULICALLY POWERED WORK IMPLEMENTS TO A WORK VEHICLE

TECHNICAL FIELD

The invention relates to coupling apparatus for work implements, and in particular, to coupling apparatus for releasably coupling hydraulically powered work implements to work vehicles.

BACKGROUND

Work vehicles, such as skid steer loaders and front loaders used in construction and other industries, are often used to perform various different jobs at a worksite. As a result, most work vehicles are configured to allow different specialized tools or work implements to be connected to the work vehicles for performing the different jobs. These work implements are often coupled to one or movable boom arms on the work vehicle, allowing the work implement to be used to perform jobs at a distance away from the work vehicle. For example, a front loader may be equipped with a bucket located at a distal end of a boom arm, allowing the front loader to be used for digging a trench or hole at a significant distance from the work vehicle. This is generally desirable as it provides for a greater working range and allows the operator to work at a distance away from dangerous work areas.

Since different work implements can be coupled to the same work vehicles, it is often necessary to switch between work implements while the work vehicle is at a worksite. This generally requires that the operator of the work vehicle manipulate the work vehicle and/or work implement to mechanically attach the work implement to the work vehicle.

In some instances, the different tools or work implements used to perform a particular job are powered work implements, generally meaning that the work implement includes one or more portions that are capable of moving relative to another portion of the work implement in order to do work. For example, a hydraulically powered loader bucket may include a lower bucket portion that provides a container for receiving objects (such as logs or rocks), and an upper fork portion movably connected to the bucket portion. The fork portion could be used for moving objects into the bucket and then securing the objects in place, for example to prevent them from being dislodged when the work vehicle or boom arm is moving.

Typically, hydraulically powered work implements will include one or more hydraulic actuators or motors, used to effect movement of the different portions of the work implement. For example, the upper fork portion described above could be moved with respect to the bucket portion by extending and retracting one or more hydraulic cylinders coupled to the bucket portion.

The hydraulic actuators are controlled and powered by a hydraulic system which uses one or more hydraulic fluid lines to connect the actuators to a hydraulic power source. The hydraulic power source can be controlled to selectively extend and retract the hydraulic actuators as desired to cause movement of the powered work implement by alternatively increasing or decreasing the pressure in one or more of the fluid lines.

The hydraulic power source can often be fairly large and heavy, and is often located on the work vehicle at a distance away from the work implement. In most cases, since the powered work implement is not permanently affixed to the work vehicle, it is necessary to provide means for coupling and decoupling the hydraulic system on the work implement with the hydraulic power source on the work vehicle to allow the work implement to be used.

In many cases, the coupling and decoupling can be performed manually by an operator, who may exit from the vehicle, secure the hydraulic system of the work implement to the hydraulic power source, and return to the work vehicle before operating the powered work implement. However, such a method is undesirable, as it can be time-consuming, can tend to increase the risk of leaking hydraulic fluid when coupling or decoupling fluid hoses, and may increase the risk that the operator is injured, particularly when the work vehicle is being used on a dangerous worksite.

Accordingly, there is a need for coupling apparatus that provides for improved coupling and decoupling between hydraulically powered work implements and work vehicles.

SUMMARY OF THE INVENTION

One aspect of the present invention is a coupling apparatus for releasably coupling a hydraulically activated work implement to a work vehicle, comprising an implement attachment device for attaching a work implement to a work vehicle, the implement attachment device having a forward side for facing the work implement, a rearward side for facing the work vehicle, first mounting members extending from the rearward side for mounting the implement attachment device to at least one boom arm of the work vehicle, and second mounting members for mounting the implement attachment device to the work implement, a first hydraulic coupling assembly extending from the rearward side of the implement attachment device, the first hydraulic coupling assembly comprising a first coupler configured for fluid communication with a hydraulic power source on the work vehicle, and a second hydraulic coupling assembly for mounting to the work implement, the second hydraulic coupling assembly comprising a second coupler configured for fluid communication with a hydraulic system of the work implement, the second coupler being shaped and configured for engaging the first coupler, wherein the first coupler is movable between a retracted position and an extended position so as to selectively engage the first coupler with the second coupler, when the work implement is attached to the implement attachment device and the second hydraulic coupling assembly is mounted to the work implement, for placing the hydraulic system of the work implement in fluid communication with the hydraulic power source.

The second coupling assembly may be mounted to the work implement at a location within a mounting saddle of the work implement, the mounting saddle being configured for receiving the second mounting members, and the plate member may define an opening sized and located so as to receive the second hydraulic coupling assembly to allow the second coupler to engage the first coupler when the work implement is attached to the implement attachment plate.

The first hydraulic coupling assembly may comprise a first coupling block slidably connected to the plate member, the first coupling block presenting a first mating surface, and a hydraulic actuator connected to the first coupling block and the plate member for moving the mating surface of the first coupling block between the retracted position and the extended position. The second hydraulic coupling assembly may include a second coupling block secured to a surface of the work implement facing the forward side of the implement attachment plate, the second coupling block presenting a second mating surface, the second mating surface being sized and shaped to engage the first mating surface when the first coupling block is in the extended position. The first coupling block may be slidably connected to the plate member so that the hydraulic actuator moves the first mating surface of the first coupling block along an axis of motion generally parallel to the plate member.

The coupling apparatus may further include at least one male coupler extending from the first mating surface and at least one female coupler provided in the second mating surface, the at least one female coupler sized and shaped for receiving the at least one male coupler, wherein the at east one male coupler engages the at least one female coupler to provide for fluid communication between the hydraulic system on the work implement and the hydraulic power source when the first coupling block is in the extended position. The hydraulic actuator may be configured to fix the first coupling block in the extended position for maintaining the engagement between the first mating surface and the second mating surface.

The first coupling block may include at least one alignment pin, and the second coupling block at least one bore shaped for receiving the at least one alignment pin. The at least one male coupler may include a pair of male couplers, and the at least one female coupler may include a pair of female couplers, each of the female couplers being sized and shaped to receive one of the male couplers. The opening defined by the plate member may include a cut-out extending from an edge of the plate member.

The first coupling assembly may include a mount secured to the rearward side of the plate member, the mount presenting a slide surface having a guide slot therein, and wherein the first coupling block has a guide member shaped to fit within the guide slot. The first coupling block may include a L-shaped block having a first flange portion shaped to slidably move along the slide surface, and a second flange portion extending perpendicularly from the first flange portion, the second flange portion having the first mating surface.

According to another aspect of the invention, there is provided a coupling apparatus for releasably coupling a hydraulically activated work implement to a work vehicle, comprising an implement attachment device for attaching a work implement to a work vehicle, the implement attachment device having a forward side for facing the work implement, a rearward side for facing the work vehicle, first mounting members extending from the rearward side for mounting the implement attachment device to at least one boom arm of the work vehicle, and second mounting members for mounting the implement attachment device to the work implement, and a first hydraulic coupling assembly extending from the rearward side of the implement attachment device, the first hydraulic coupling assembly comprising a first coupler in fluid communication with a hydraulic power source on the work vehicle, wherein the first coupler is movable between a retracted position and an extended position so as to selectively engage the first coupler with a second coupler of a second coupling assembly in fluid communication with a hydraulic system of the work implement when the work implement is attached to the implement attachment device, and thereby place the hydraulic system of the work implement in fluid communication with the hydraulic power source.

Other aspects and features of the invention will become apparent to those ordinarily skilled in the art upon review of the following description of some exemplary embodiments.

BRIEF DESCRIPTION OF THE DRAWINGS

For a better understanding of the embodiments, and to show more clearly how they may be carried into effect, reference will now be made, by way of example, to the accompanying drawings, in which.

DETAILED DESCRIPTION OF THE INVENTION

Figure 1:
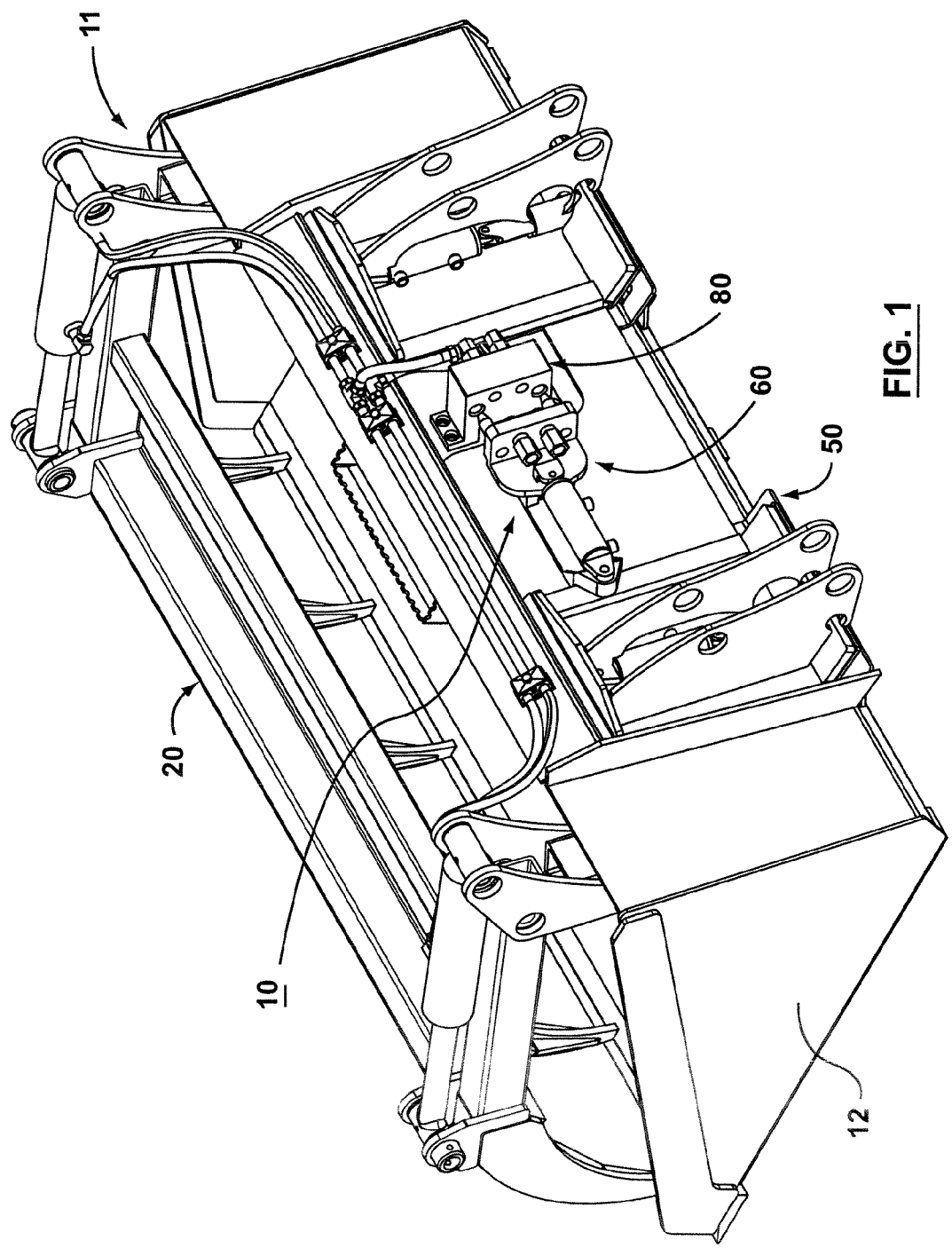
FIG. 1 is a perspective view of a coupling apparatus, made in accordance with one embodiment of the invention, shown secured to a work implement.

Referring now to FIG. 1, illustrated therein is a coupling apparatus shown generally as 10 made in accordance with one embodiment of the invention for coupling a hydraulically powered work implement 11 to a work vehicle, such as a skid steer loader or a front loader (not shown) having a hydraulic power source. The coupling apparatus 10 generally comprises an implement attachment device such as an implement attachment plate 50, a male hydraulic coupling assembly 60 mounted on the implement attachment plate 50, and a female hydraulic coupling assembly 80 mounted on the work implement 11. As described in greater detail below, male coupling assembly 60 is generally moveable between a retracted position and an extended position so as to allow for selective engagement of the male hydraulic coupling assembly 50 with the female coupling assembly 80 when the work implement 11 is mechanically secured to the implement attachment plate 50 to selectively place the hydraulic system of the work implement 11 in fluid communication with the hydraulic power source of the work vehicle.

Figure 2A:
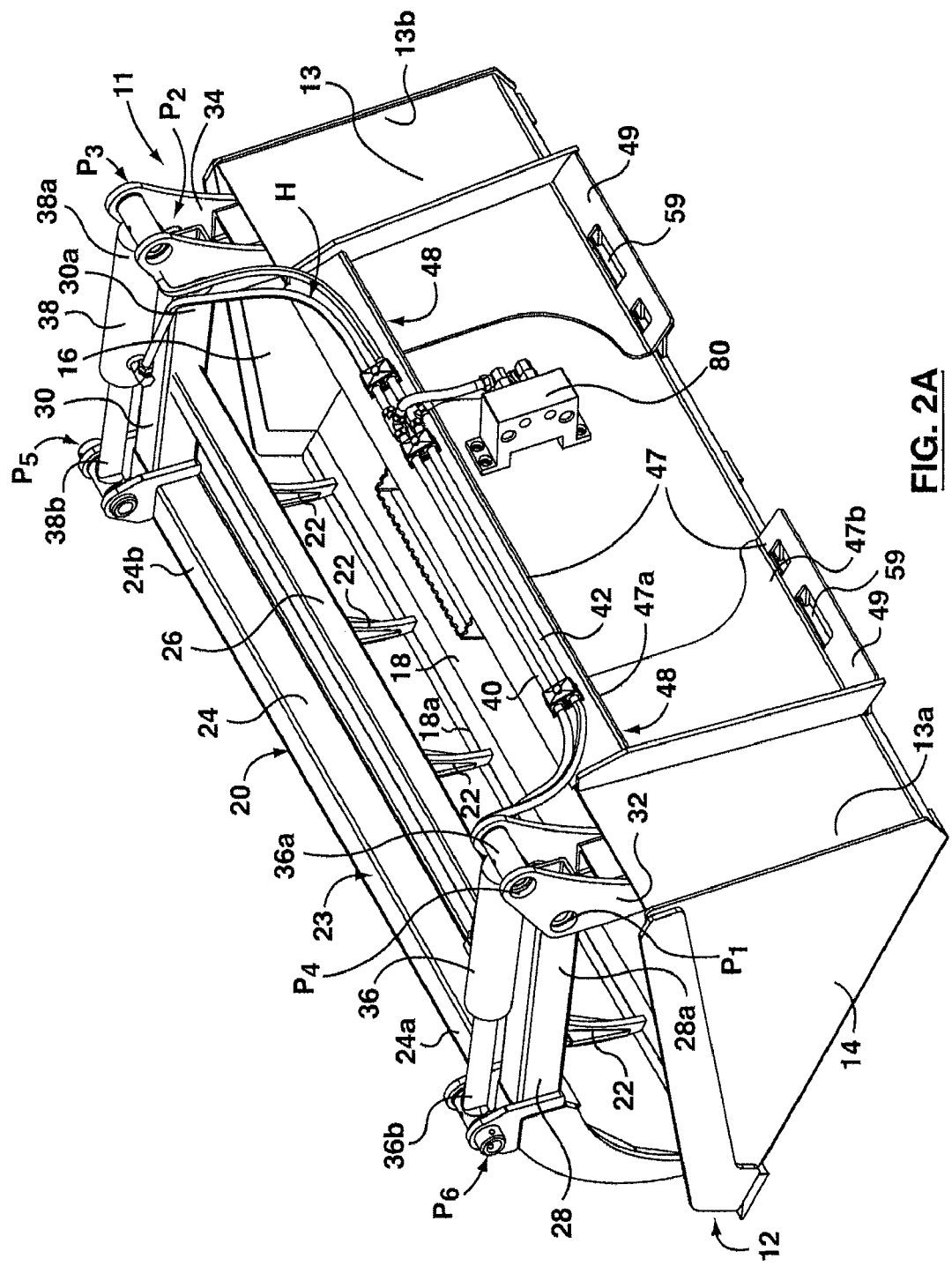
FIG. 2A is a perspective view of the work implement and a female coupling assembly of the coupling apparatus shown in FIG. 1.

Referring now to FIG. 2A, illustrated therein is one example of a work implement that could be coupled to a work vehicle using the coupling apparatus 10 of the present invention. It should be understood, however, that the coupling apparatus 10 could be used with a variety of different work implements, and the exemplary embodiments shown here are not meant to be limiting. In particular, the coupling apparatus 10 is configured to work with both hydraulically powered work implements (i.e. those work implements having a hydraulic system thereon) as well as non-hydraulically powered work implements (i.e. those work implements having no hydraulic system thereon).

As shown in FIG. 2A, the work implement 11 generally includes a bucket portion 12 and a powered tool 20 that is movable with respect to the bucket portion 12 to generally move and secure objects in the bucket portion 12. The bucket portion 12 of the work implement 11 generally includes a rear wall 13, comprising a longitudinal transversely oriented plate member, a left wall 14 located at a left end 13a of the rear wall 13, and a right wall 16 located at a right end 13b of the rear wall 13. The left wall 14 and right wall 16 are generally triangular in shape and extend forwardly from the rear wall 13 away from the work vehicle. The bucket portion 12 also includes a bottom plate 18 connected to the rear wall 13, left wall 14 and right wall 16 and defining a floor to the bucket portion 12. The rear wall 13, left wall 14, right wall 16 and bottom plate 18 define a generally four-sided, box-shaped container allowing objects to be stored in the bucket portion 12 for transportation and storage.

The claw-shaped hydraulically powered tool 20 is pivotally attached to the bucket portion 12, and is usable for securing and retaining objects (e.g. logs, rocks and other materials) within the container of the bucket portion 12. The powered tool 20 has a U-shaped frame 23 defined by a front transverse frame member 24, and is supported at a left end 24a by a left arm 28, and at a right end 24b by a right arm 30. The frame 23 also includes a middle transverse frame member 26 joining the left arm 28 and right arm 30. The powered tool 20 also includes a plurality of claw members or teeth 22 that are connected to and curve downwards from the front transverse frame member 24. The teeth 22 are usable to selectively move objects into, and retain objects within, the bucket portion 12.

The frame 23 is connected to the bucket portion 12 via first ends 28a, 30a of the left and right arms 28, 30 being pivotally connected to mounting brackets 32, 34 at pivot points $P_1$, $P_2$ respectively. This allows the frame 23 of the powered tool 20 to be pivotable about points $P_1$, $P_2$ with respect to the bucket portion 12, allowing the powered tool 20 to be movable between a closed position (as shown in FIG. 2A) to an open position (not shown). When the powered tool 20 is in the closed position, the left and right arms 28, 30 extend forwardly from the mounting brackets 32, 34 towards a front edge 18a of the bottom plate 18, and the teeth 22 extend downwards toward the bottom plate 18. When the powered tool 20 is in the open position, the left and right arms 28, 30 extend upwards and the teeth 22 are positioned out of the way so that objects can be received in the bucket portion 12.

The movement of the powered tool 20 is controlled by a hydraulic system, indicated generally as H located on the work implement. The hydraulic system H includes first and second hydraulic cylinders 36, 38 pivotally connected via first ends 36a, 38a to the mounting brackets 32, 34 at pivot points $P_3$, $P_4$, respectively. The first and second hydraulic cylinders 36, 38 are pivotally connected at second ends 36b, 38b to the front transverse member 24 at pivot points $P_5$ and $P_6$. First and second hydraulic hoses 40, 42 couple the cylinders 36, 38 to the female coupling assembly 80 mounted on the rear wall 13 of the bucket portion 12, as will be described in greater detail below.

As known in the art, the hydraulic system H can be used to extend and retract the cylinders 36, 38 to move the powered tool 20. For example, as the pressure in the first hydraulic hose 40 is increased, the hydraulic system H will tend to cause the cylinders 36, 38 to retract, opening the powered tool 20 to expose the bucket portion 12. Similarly, as the pressure in the second hydraulic hose 42 is increased, the hydraulic system H tends to cause the cylinders 36, 38 to extend, closing the powered tool 20. The movement of the powered tool 20 from the open position to the closed position can be used to "grab" objects with the teeth 22 and move the objects into the bucket portion 12.

The work implement 11 includes a mounting saddle shown generally as 47 for mechanically attaching or mounting the work implement 11 to the implement attachment plate 50. The mounting saddle 47 includes mating channels 48 at the upper end of the saddle 47a and mating flanges 49 that extend from the rear wall 13 of the bucket portion 12 at the lower end of the saddle 47b. As will be described below, the mating channels 48 and mating flanges 49 are configured for engagement with second mounting members on the implement attachment plate 50 to releasably secure the work implement 11 to the implement attachment plate 50 as desired by the operator.

Figure 2B:
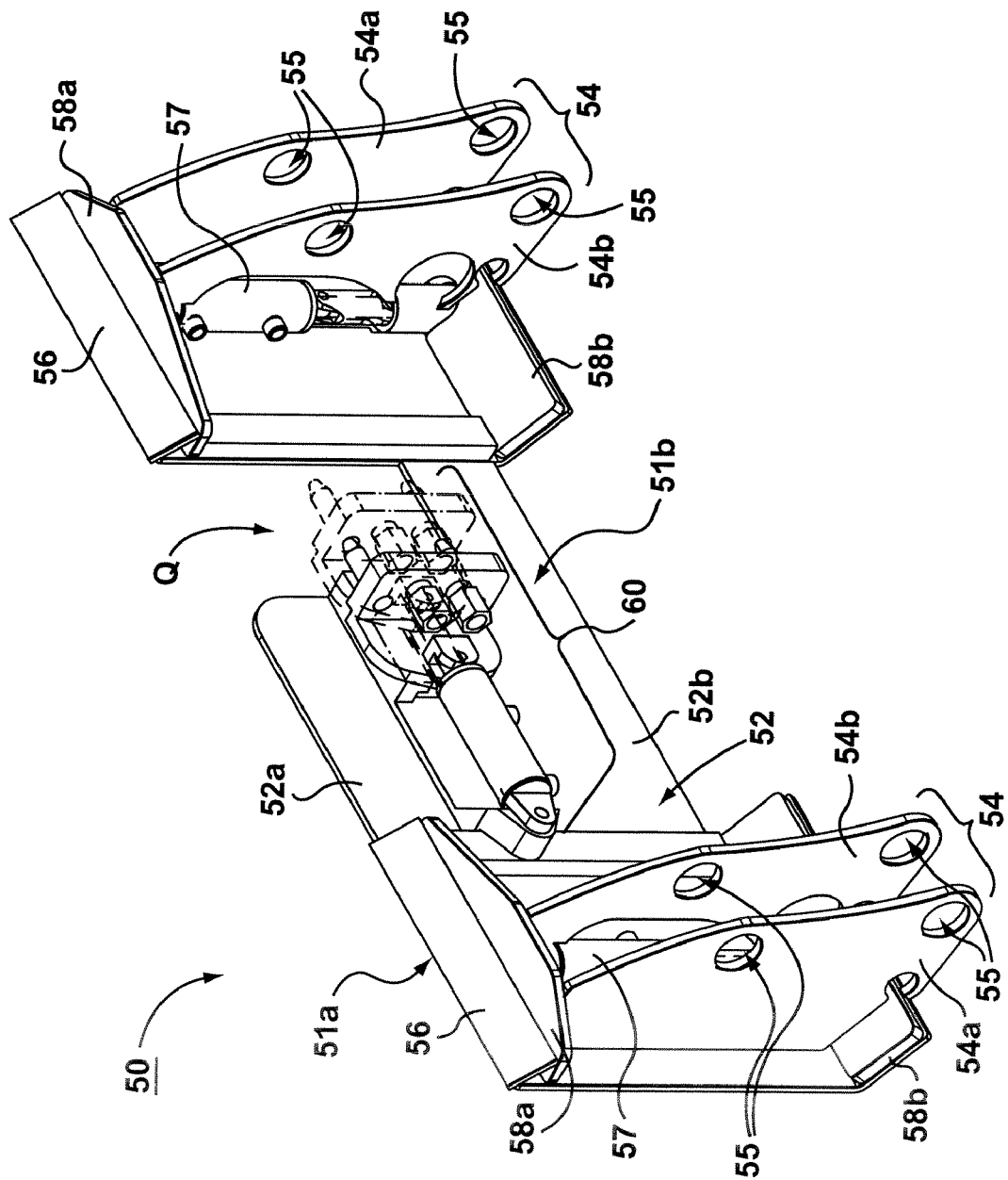
FIG. 2B is a perspective view of an implement attachment plate and a male coupling assembly of the coupling apparatus shown in FIG. 1.
Figure 2C:
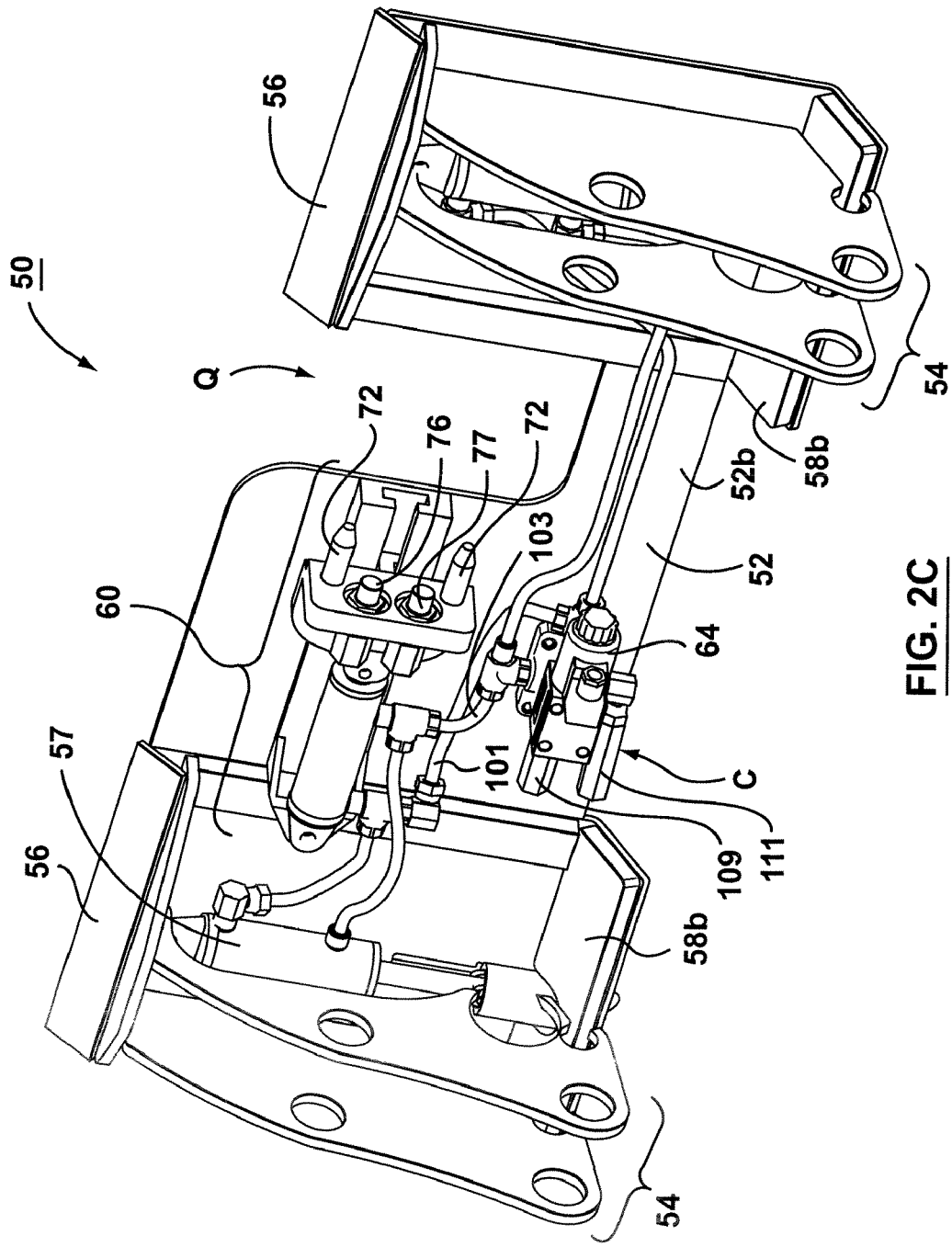
FIG. 2C is another perspective view of the implement attachment plate and male coupling assembly of FIG. 2B, shown with a diverter and hydraulic hoses mounted thereon.

Turning now to FIGS. 2B and 2C, in the embodiment shown therein, the implement attachment device is implement attachment plate 50, sometimes referred to as a quick fit attachment plate or a universal adapter, which can be used with a variety of different work implements having a standard mounting apparatus such as mounting saddle 47. The implement attachment device allows an operator to quickly change work implements by mechanically coupling the work implement to the implement attachment device. However, it should be appreciated that the use of the coupling apparatus 10 of the present invention is not limited to universal type attachment plates, and could be used in conjunction with other types of implement attachment connectors or devices.

The implement attachment plate 50 includes a plate member 52, which is a generally rectangular, planar plate, typically made of steel or another rigid material. When the implement attachment plate 50 is mounted to a work vehicle, the plate member 50 generally extends along a plane transverse to the longitudinal axis of the work vehicle, with a forward side 51a facing the work implement 11 and a rearward side 51b facing the work vehicle.

The implement attachment plate 50 also defines an opening, in the form of cut-out portion Q in the plate member 52. The cut-out portion Q is configured for receiving the female coupling assembly 80, as will be described in greater detail below.

Figure 2D:
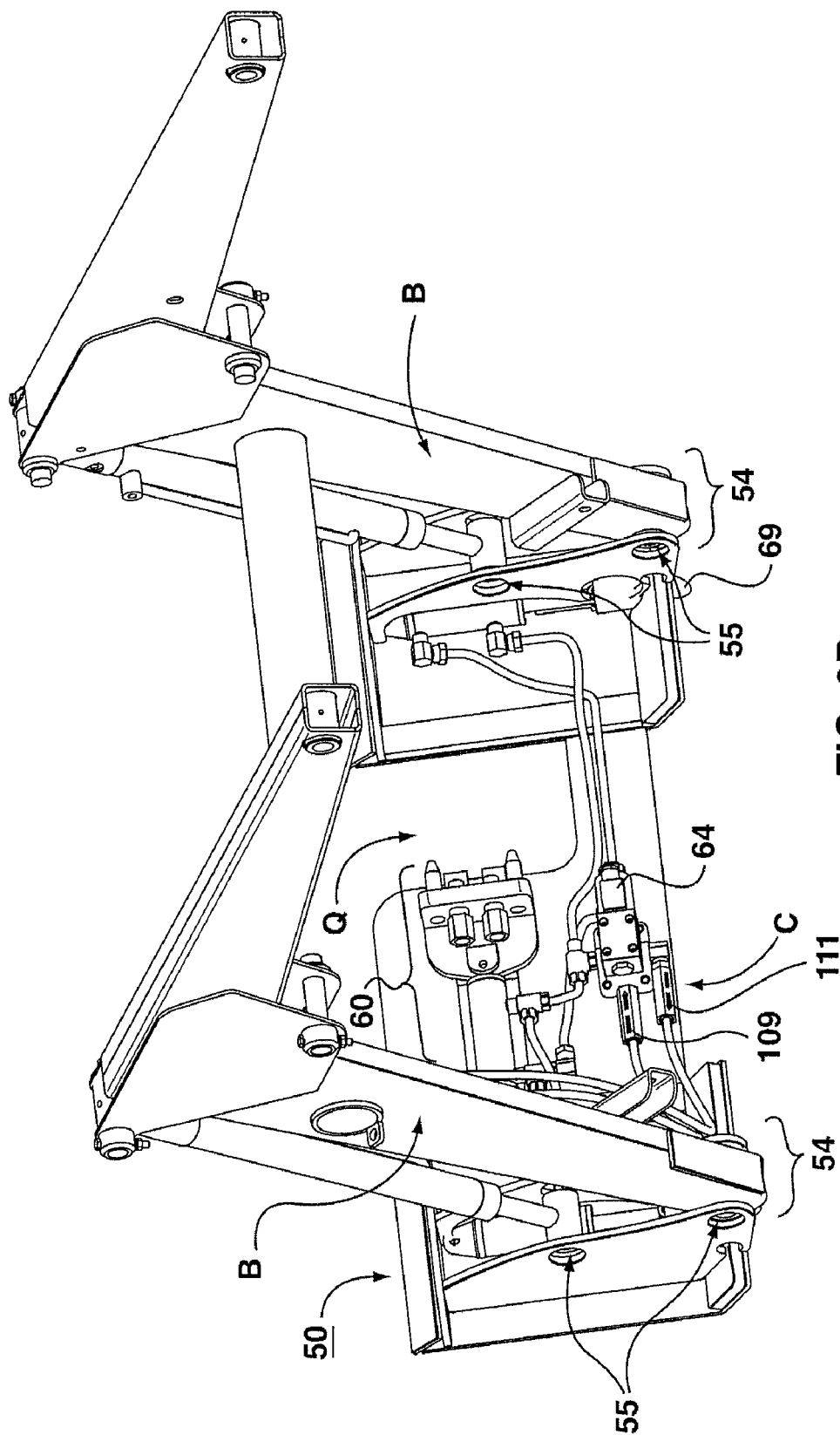
FIG. 2D is a perspective view of the implement attachment plate of FIG. 2C mounted to boom arms.

The implement attachment plate 50 includes first mounting members, such as mounting brackets 54, connected to and extending rearwardly from the rearward side 51b of the plate member 52 towards the work vehicle (not shown). The mounting brackets 54 are configured for mounting the implement attachment plate 50 to the boom arms B of the work vehicle, as best shown in FIG. 2D. Each of the mounting brackets 54 includes an outer plate member 54a and an inner plate member 54b that are generally parallel and vertically secured to the plate member 52. The mounting brackets 54 include a plurality of mounting holes 55 therein for connecting the mounting brackets to the movable loader boom arms B or other attachment points on the work vehicle.

The implement attachment plate 50 also includes second mounting members for mounting the plate member 52 to the mounting saddle 47 of the work implement 11, such as mounting flanges 56 located proximate the upper edge 52*a* of the plate member 52. The mounting flanges 56 are configured to fit into the mating channels 48 of work implement 11 to mechanically attach the implement attachment plate 50 to the work implement 11.

The second mounting members also include mounting plates 58*a* located proximate the upper edge 52*a* of plate member 52, and mounting plates 58*b* located proximate the lower edge 52*b* of the plate member 52. Hydraulic cylinders 57 are located between outer plate member 54*a* and inner plate member 54*b* of mounting brackets 54. During use, the implement attachment plate 50 is typically connected to the boom arms B of a work vehicle in a conventional manner using mounting holes 55, as shown in FIG. 2D.

The implement attachment plate 50 facilitates mechanically coupling and decoupling various different work implements, such as work implement 11, without the need for the operator to dismount from the vehicle to manually couple or decouple the work implement. For example, when the operator wants to secure the work implement 11 to the work vehicle, the operator uses the movable boom arms B to cause the mounting flanges 56 of the universal attachment plate 50 to engage with the mating channels 48 on the work implement 11. The operator then moves the boom arms B to engage the mounting plates 58*b* of the implement attachment plate 50 with the mating flanges 49 on the work implement 11. The operator then extends the cylinders 57, which moves a pin 69 (see FIG. 2D) into holes 59 of the mating flanges 49 (see FIG. 2A), and applies a force between the mating flanges 49 and the mating channels 48, mechanically securing the implement attachment plate 50 to the work implement 11. When the operator wishes to subsequently decouple the implement attachment plate 50 from the work implement 11, the process is generally reversed.

As the operator uses the work implement 11 to do work at a worksite, the cylinders 57 can be kept pressurized through the use of a check-valves 109, 111 or other means connected to the cylinders 57 to ensure that the work implement 11 remains mechanically secured to the implement attachment plate 50 as desired by the operator. In some embodiments, the cylinders 57 are configured such that certain movements of the boom arms B of the work vehicle tends to increase the pressure in the cylinders 57 (up to a predetermined level), for example by providing shots of hydraulic fluid through the check valve 109 every time the boom arms B move in a predetermined manner. This tends to ensure ensuring that the mechanical coupling is securely maintained between the work implement 11 and the implement attachment plate 50.

Accordingly, the universal implement attachment plate 50 can be used with various work implements configured with a similar mounting apparatus, such as mounting saddle 47 having mechanical mating flanges 49 and mating channels 48. For example, various different work implements, both hydraulically powered and not hydraulically powered, could be provided with the mating flanges 49 and mating channels 48 for connecting to the implement attachment plate 50. Thus, various different types of work implements, including hydraulically powered and non-hydraulically powered work implements, can be automatically secured to the work vehicle using a single implement attachment plate 50 without requiring manual intervention by the operator.

The implement attachment plate 50 provides a mounting location for the male coupling assembly 60. The male coupling assembly 60 is generally configured for selectively coupling and decoupling the hydraulic system H of the work implement 11 with the hydraulic power source on the work vehicle when the work implement 11 is mechanically secured to the implement attachment plate. In some embodiments, the male coupling assembly 60 functions independently during mechanical coupling of the work implement 11 to the implement attachment plate 50. Thus, as will be explained in greater detail below, the implement attachment plate 50 can be used with both hydraulically powered and non-hydraulically powered work implements without the need to change the implement attachment plate 50. For example, when used with a non-hydraulically powered work implement the implement attachment plate 50 can be mechanically secured to the work implement without the need to activate the male coupling assembly 60. However, where the work implement is a hydraulically powered work implement, such as work implement 11, the male coupling assembly 50 can be selectively engaged to connect the fluid system H to the hydraulic power source once the work implement 11 has been mechanically secured to the implement attachment plate 50.

As shown in FIGS. 2B to 2D, the male coupling assembly 60 is mounted to the rearward side 51*b* of the implement attachment plate 50. This allows the male coupling assembly 60 to be provided in a location on the implement attachment plate 50 where it will not interfere with the mechanical coupling of the attachment plate 50 to the work implement 11, and tends to allow the operator to more clearly see the operation of the male coupling assembly 60 when in use.

Figure 3A:
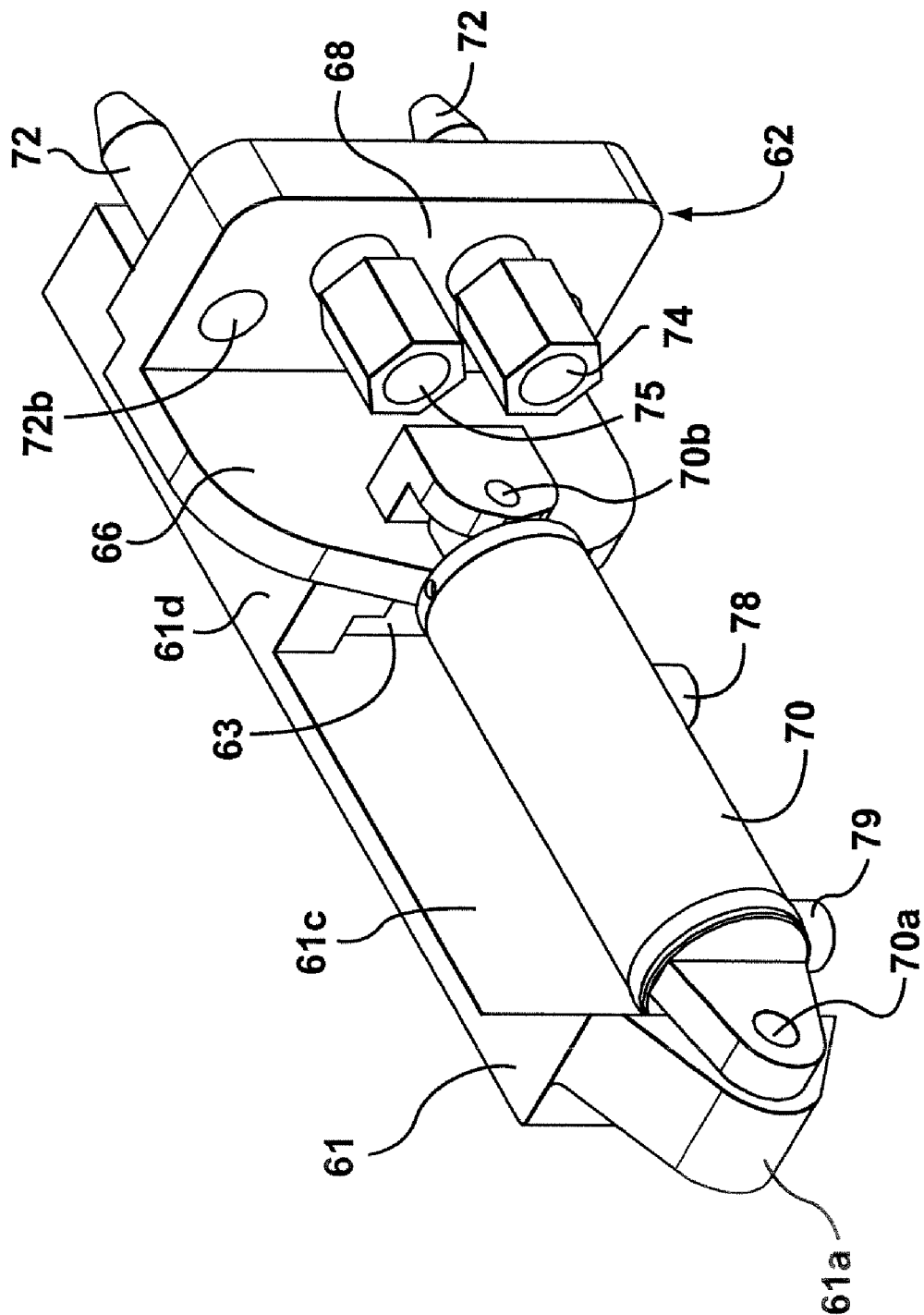
FIG. 3A is a close up perspective view of the male coupling assembly of FIG. 2.
Figure 3B:
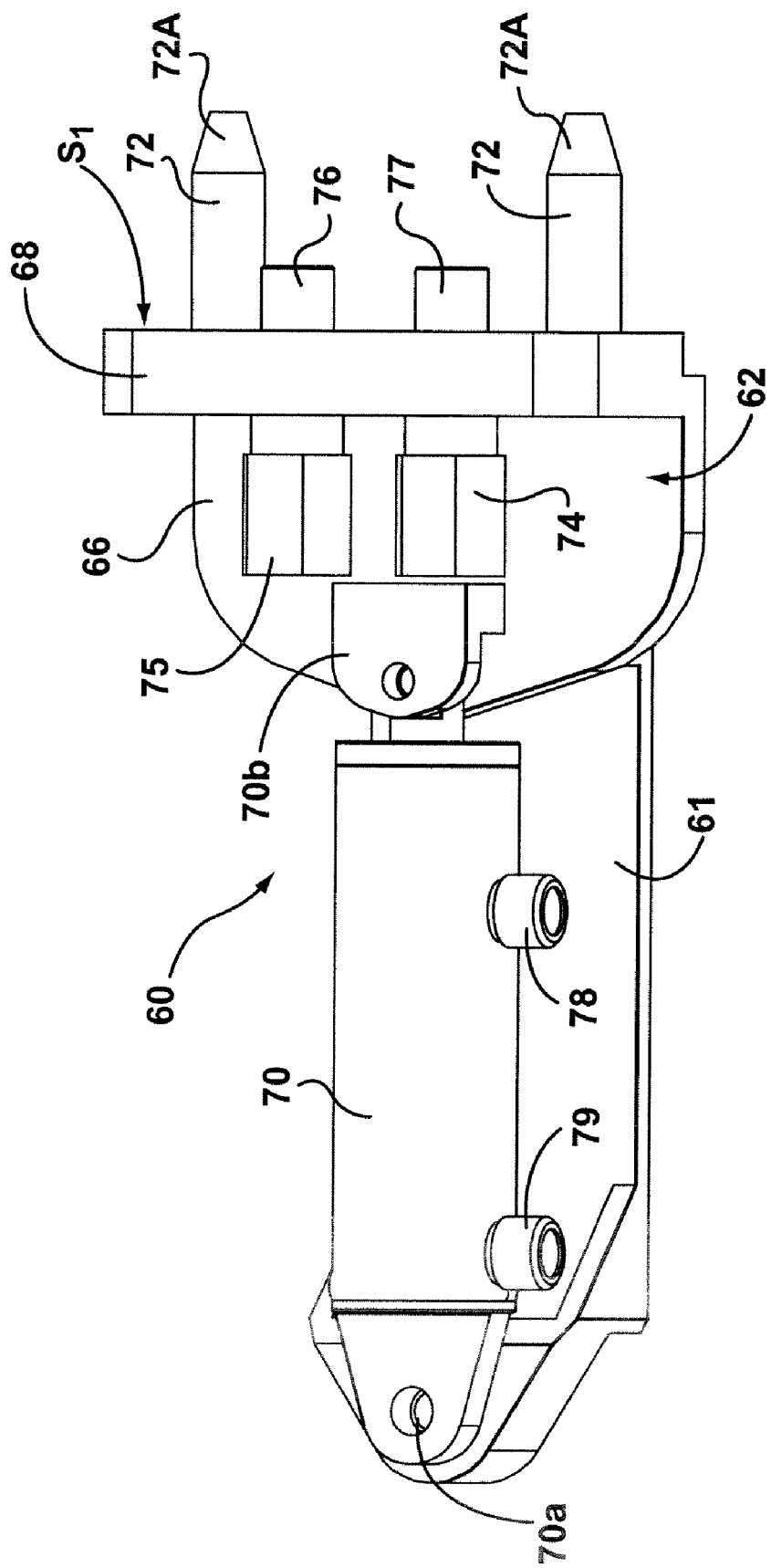
FIG. 3B is a side perspective view of the male coupling assembly of FIG. 3A.
Figure 3C:
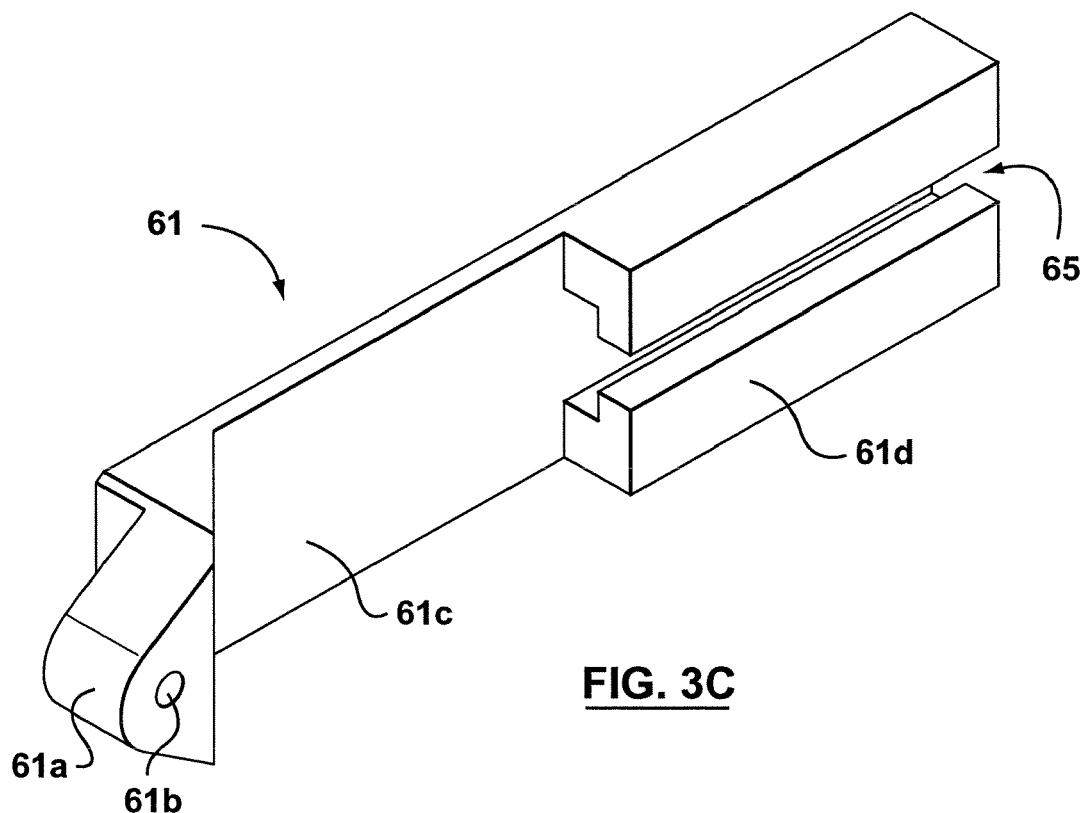
FIG. 3C is a perspective view of a mount of the male coupling assembly.

Turning now to FIGS. 3A to 3D, the male coupling assembly 60 generally includes a mount 61 that is rigidly secured to the rearward side 51*b* of the plate member 52, such as by welding or bolting. As best shown in FIGS. 3A and 3C, the mount has a first end 61*a* with a mounting hole 61*b* for securing a hydraulic cylinder 70, a recessed portion 61*c* for receiving the hydraulic cylinder 70, and a second end 62*d* shaped to define a guide slot 65.

The male coupling assembly 60 also includes a male L-shaped coupling block 62 that is slidably coupled to the mount 61. The coupling block 62 has a first flange portion 66 having a T-shaped guide member 63 extending therefrom that fits into the guide slot 65 in mount 61, as shown in FIGS. 3A and 3C, allowing the coupling block 62 to move between an extended position and a retracted position to selectively engage and disengage the hydraulic system H on the work implement 11.

The movement of the coupling block 62 is controlled by the hydraulic actuator 70 secured at a first end 70*a* to the mounting hole 61*b* on the mount 61, and to the coupling block 62 at a second end 70*b* of cylinder rod 70*c*, using bolts or other fasteners. The hydraulic actuator 70 is configured to selectively move the coupling block 62 between the retracted position (shown in solid lines in FIG. 2B) and the extended position (shown in dashed lines in FIG. 2B), along an axis of motion that is generally parallel to the plane of the plate member 52. The hydraulic actuator 70 is controlled by a hydraulic control system C (as shown generally in FIGS. 2C, 2D, 5A and 5B) having hydraulic couplings 78, 79 and hydraulic hoses 101, 103 coupled thereto. In some embodiments, the hydraulic control system C is a separate fluid system, allowing the hydraulic actuator 70 to be controlled independently of the movement of both the powered tool 20 and the implement attachment plate 50. In some embodiments, for example as shown in FIGS. 2C and 2D, the hydraulic control system C can include a electrically powered diverter 64 to better control the movement of the cylinder 70. In particular, the diverter 64 can be used to "fix" or lock the hydraulic cylinder 70 in the extended position by tending to increase the pressure in the fluid lines 101 when the boom arms B are moved in a particular fashion. For example, when the boom arms B are moved to cause the implement attachment plate 50 to "roll back", (i.e. by retracting the cylinders on the boom arms B), a shot of hydraulic fluid will be provided through check valve 109 and directed by the diverter 64 to fluid line 101. This tends to keep the cylinder 70 in an extending position and ensure that a desired seal is maintained between the male hydraulic couplers 76, 77 and female hydraulic couplers 91, 93 on the female coupling assembly 80, as described in detail below.

When it is desired to decouple the first coupling block 62 from the second coupling block 82, the diverter 64 can be switched to selectively increase the pressure in fluid line 103 when the boom arms B cause the implement attachment plate to "roll back". Thus, the cylinder 70 will be retracted, with excess fluid will pass through the check valve 111 to return to the power source, causing the first coupling block 62 to become disengaged with the second coupling block 82. Thus, there is no need to use locking couplers or locking sleeves between the male hydraulic coupling 60 and/or the female hydraulic coupling 80 to ensure that the desired fluid connection is maintained between the hydraulic system H and the fluid power source.

In some embodiments, for example as shown in FIGS. 2C and 2C, the hydraulic control system C is coupled to the cylinders 57 such that fluid lines 101, 103 control the operation of the cylinders 57. Alternatively, in other embodiments, the hydraulic control system C can operate independently of the control of the cylinders 57.

Figure 3D:
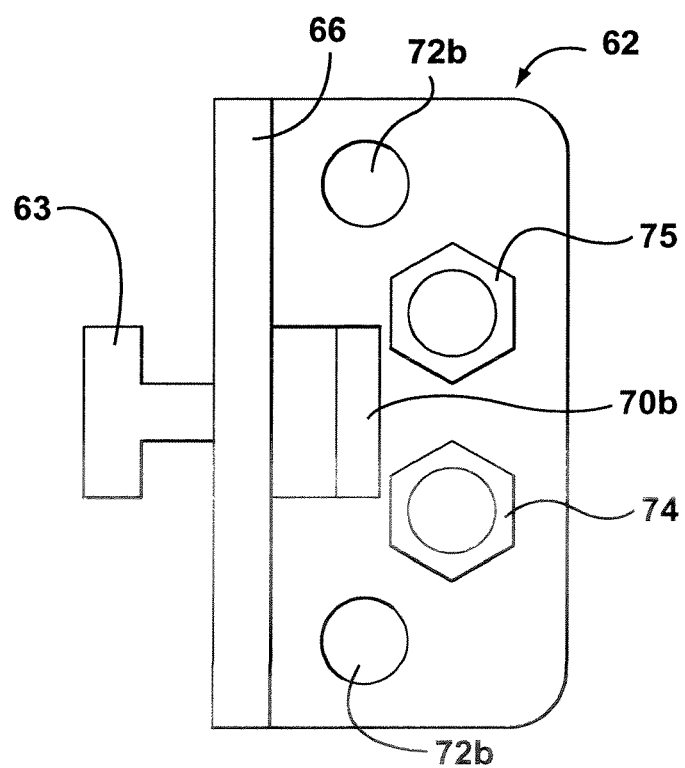
FIG. 3D is an end view of the block for slidably engaging the mount of FIG. 3C.

Turning specifically to FIGS. 3A, 3B and 3D, the coupling block 62 includes a second flange portion 68 generally perpendicular to the first flange portion 66 and extending outwardly from the first flange portion 66 away from the slide mount 61. The second flange portion 68 presents a first mating surface $S_1$ away from the hydraulic actuator 70 for engaging with a corresponding mating face $S_2$ on the female coupling assembly 80, as described in greater detail below.

Extending outwardly from the first mating surface $S_1$ of coupling block 62 are alignment pins 72 secured within the second flange portion 68 at first ends 72b. Also extending outwardly from the first mating surface $S_1$ are first and second male hydraulic couplers 76, 77. The alignment pins 72 are generally longer in length and extend further than the couplers 76, 77, and are used to assist in aligning the first and second mating surfaces $S_1$, $S_2$ when the coupling block 62 is moved from the retracted position to the extended position, to properly align the couplers 76, 77 within the passageways 88, 89 in the coupling block 82 during coupling.

Figure 5A:
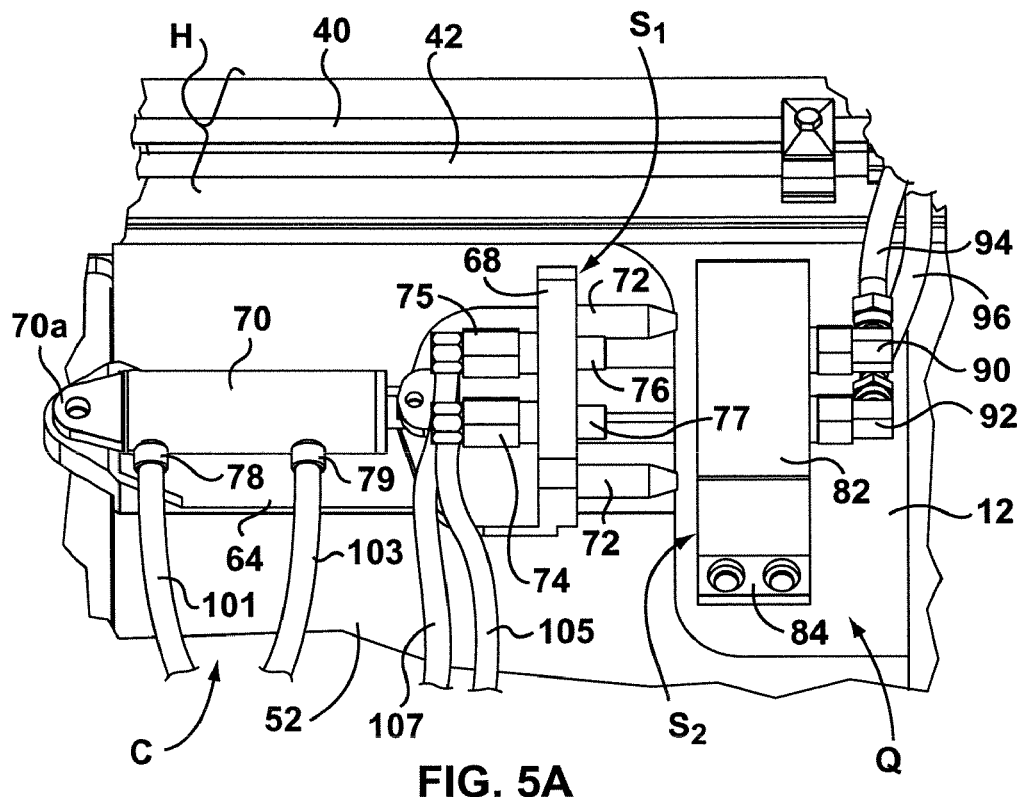
FIG. 5A is a side elevation view of the male coupling assembly of FIG. 3A shown in a disengaged relationship with the female coupling assembly of FIG. 4A.
Figure 5B:
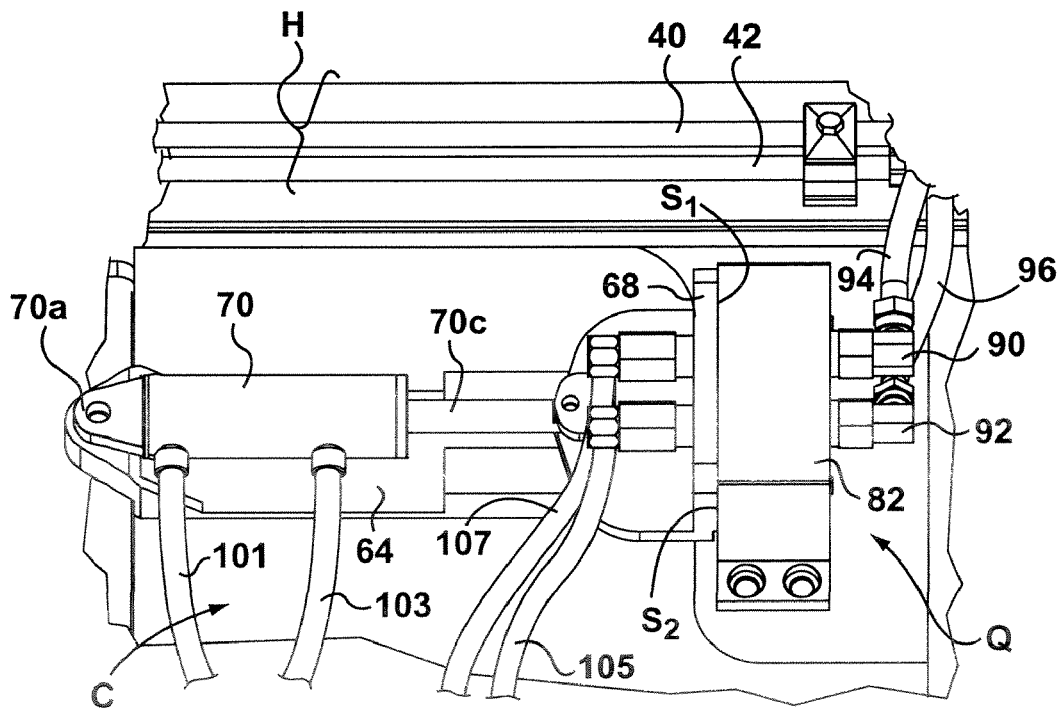
FIG. 5B is a side elevation view of the male coupling assembly of FIG. 3A shown in an engaged relationship with female coupling assembly of FIG. 4A.

The male hydraulic couplers 76, 77 are preferably conventional quick disconnect couplers as known in the art that allow hydraulic fluid to flow therethrough when the couplers 76, 77 are engaged, but which prevent fluid from leaking when the couplers 76, 77 are disengaged. The opposing ends 74, 75 of the male hydraulic couplers 76, 77 are configured to be coupled to the hydraulic power source on the work vehicle using hoses 105, 107 (as shown in FIGS. 5A and 5B) to selectively power the hydraulic system H when coupled.

Figure 4A:
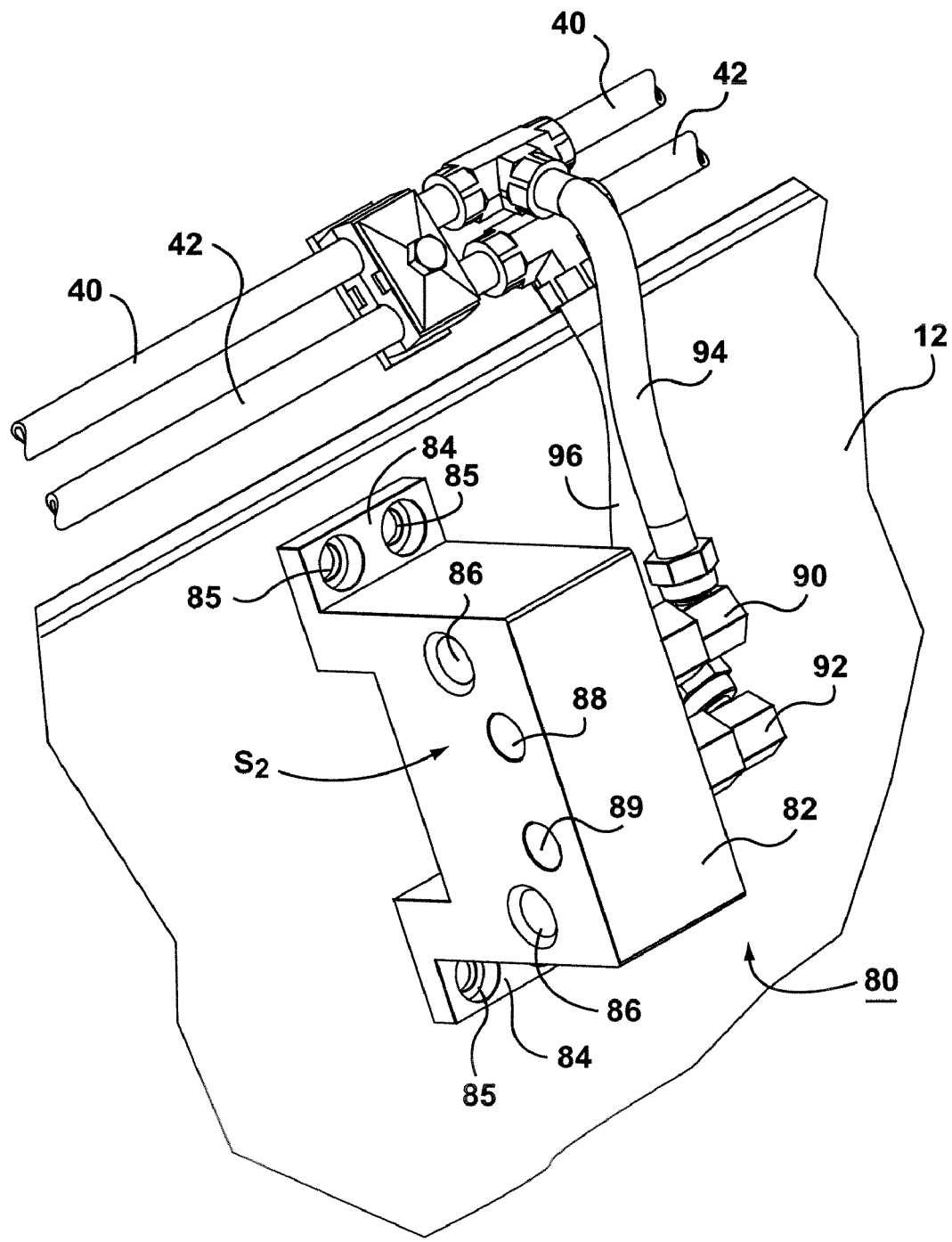
FIG. 4A is a perspective view of a female coupling assembly mounted on the work implement of FIG. 1.
Figure 4B:
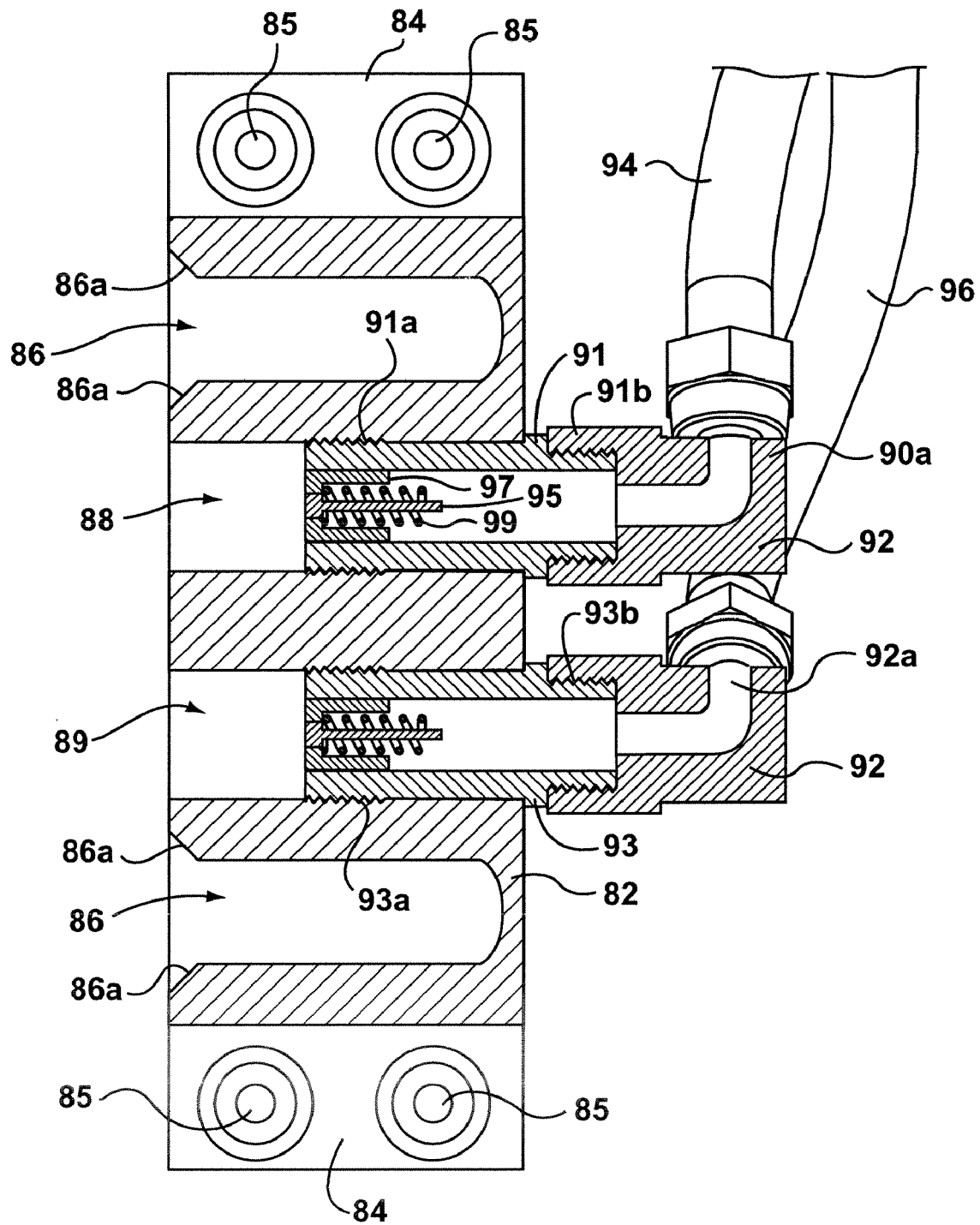
FIG. 4B is a partial cross-sectional view of the female coupling assembly of FIG. 4A.

Turning now to FIGS. 4A to 4B, the female coupling assembly 80 is shown in greater detail. The female coupling assembly 80 generally includes a rectangular-shaped coupling block 82 configured for mounting to the rear wall 13 of the work implement 11, such as on the bucket portion 12. The coupling block 82 presents the second mating surface $S_2$ that is sized and shaped for engaging with the first mating surface $S_1$.

In some embodiments, the coupling block 82 can be mounted via flanges 84 that extend outwardly from the ends of the coupling block 82, and include a plurality of bolt holes 85 for bolting the couping block 82 to the rear wall 13 of the bucket portion 12 of the work implement 11. In some embodiments, this can allow the coupling block 82 to be retrofitted to existing hydraulically powered work implements.

As best shown in FIG. 4B, the coupling block 82 has a plurality of recesses and passageways therein, including pin bores 86 and first and second coupler passageways 88, 89. The pin bores 86 are generally configured to receive the alignment pins 72, and include angled surfaces 86a for engaging with corresponding tapered portions 72a on the alignment pins 72 (as shown in FIG. 3B). The angled surfaces 86a and tapered portions 72a tend to assist with centering the alignment pins 72 within the bores 86, to ensure that the male hydraulic couplers 76, 77 are properly aligned within the passageways 88, 89. In some embodiments, the bores 86 extend all the way through the coupling block 82. In other embodiments, for example as shown in FIG. 4B, the bores 86 extend only partly through the block 72 of sufficient length to receive the alignment pins 72.

The first and second coupler passageways 88, 89 are open at their first ends 88a, 89a to receive the first and second male couplers 76, 77, respectively. Located within the first and second passageways 88, 89 are first and second female couplers 91, 93, which could be conventional check-valve couplers as known in the art. The first and second female couplers 91, 93 are secured to the passageways 88, 89 via threaded first ends 91a, 93a. The opposite ends 91b, 93b are secured to first and second connectors 90, 92, in which in turn are coupled at their ends 90a, 92a to first and second hydraulic hoses 94, 96.

The first and second hydraulic hoses 94, 96 connect the connectors 90, 92 to the hydraulic system H on the work implement 11. When the male coupling assembly 60 and female coupling assembly 80 are fully engaged, the male couplers 76, 77 and female couplers 91, 93 are engaged in fluid communication, allowing hydraulic fluid to pass between the hydraulic power source and the hydraulic system H on the work implement 11 (as best shown in FIG. 5C).

Figure 5C:
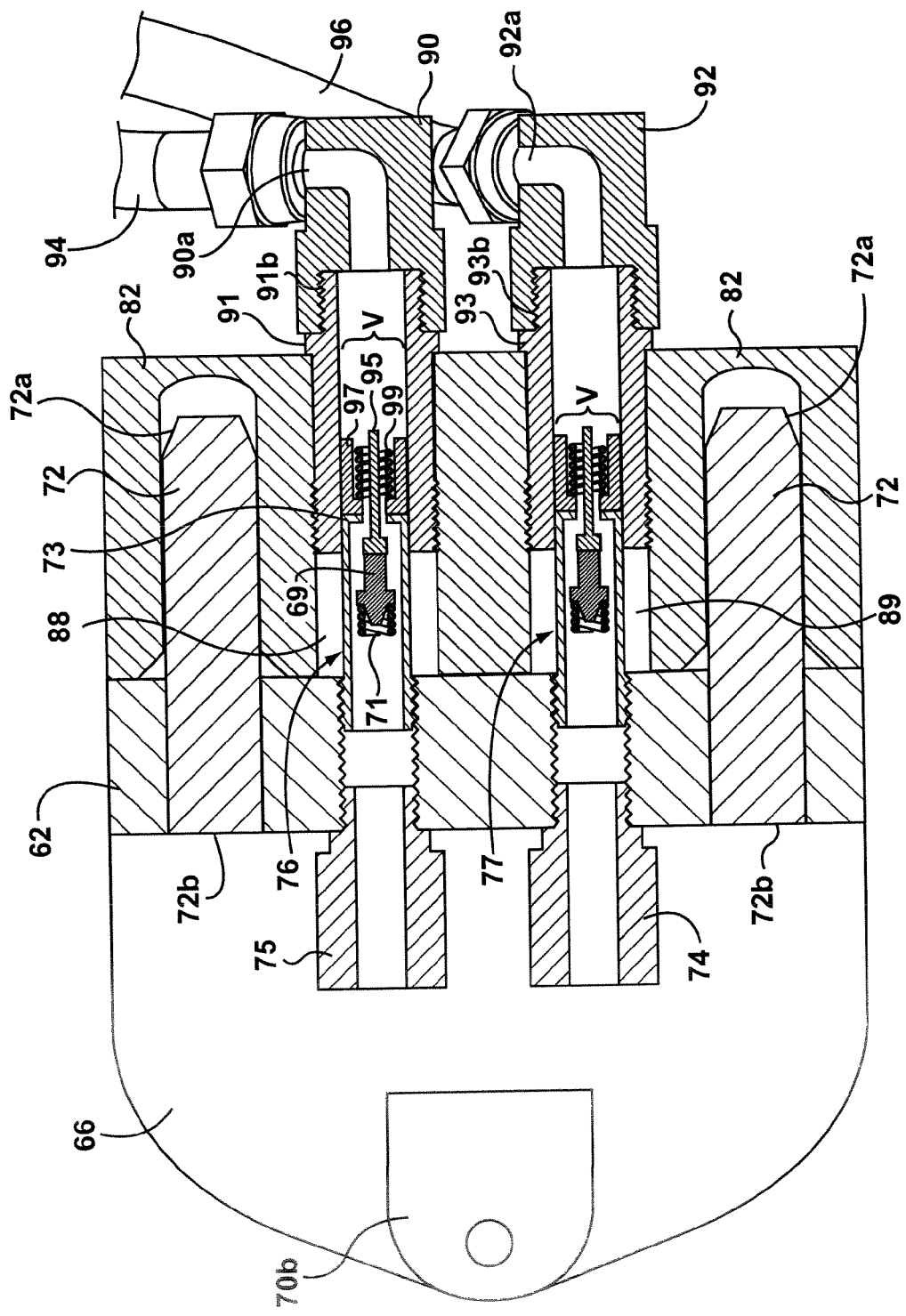
FIG. 5C is a partial cross-sectional view of the male coupling assembly of FIG. 3A and the female coupling assembly of FIG. 4A shown in an engaged relationship.

Turning now to FIGS. 5A to 5C, the selective engagement and disengagement of the male coupling assembly 60 and female coupling assembly 80 is shown.

In FIG. 5A, the male coupling assembly 60 is shown in the disengaged position, with the female coupling assembly 80 received in the opening Q. The hydraulic actuator 70 is retracted, placing the male coupling block 62 in the retracted position with the alignment pins 72 and male couplers 76, 77 disengaged from the female coupling block 82. Retraction of the cylinder 70 can be effected by increasing the pressure in the fluid line 103 of the hydraulic control system C above the pressure in the fluid line 101, as is known in the art. This can be done in some embodiments by switching the diverter 64, as described above. Similarly, the pressure in the fluid line 101 can be increased to extend the hydraulic actuator 70 to cause engagement between the male hydraulic assembly 60 and female hydraulic assembly 80, as shown in FIG. 5B.

As the hydraulic actuator 70 begins to extend from the retracted position, the alignment pins 72 in the block 62 engage the bores 86 in the coupling block 82, ensuring proper alignment between the male couplers 76, 77 and the passageways 88, 89. As the actuator 70 continues to extend, the male couplers 76, 77 will engage with the female couplers 91, 93 within the passageways 88, 89. At this point, the check-valve couplers begin to open with fixed center pins 95 within the female couplers 91, 93 engaging floating center pins 69 mounted on springs 71 within the male couplers 76, 77, while the ends 73 of the couplers 76, 77 engage with floating sealing members 97 supported by springs 99 within the female couplers 91, 93.

The actuator 70 continues to extend until the first and second mating surfaces $S_1$, $S_2$ are engaged, as shown in FIGS. 5B and 5C. As this happens, the springs 71 and springs 99 compress, moving the floating center pin 69 and floating sealing members 97, to create a fluid passageway between the male couplers 76, 77 and female couplers 91, 93. Once the first and second mating surfaces $S_1$, $S_2$ are fully engaged, the male couplers 76, 77 are fully engaged with the female couplers 91, 93 within the passageways 88, 89, and fluid can now flow from the hydraulic power source into the male coupling block 62 via hoses 105, 107, and through the female coupling block 82 into hoses 94, 96 for powering the hydraulic system H on the work implement.

During decoupling, the check-valve couplers V operate in the opposite manner ensuring that a tight fluid seal is achieved before the male couplers 76, 77 and female couplers 91, 93 are disengaged, preventing leaks.

While the male coupling assembly 60 and female coupling assembly 80 are engaged, the fluid hose 101 connected to the hydraulic actuator 70 can be kept in a pressurized state (above a predetermined fluid pressure), such as by the use of control system check-valves 109, 111 or other devices, to ensure that the desired fluid connection is maintained without leaking while the work implement 11 is being used system configured diverter 64. In some embodiments, the hydraulic control system C can be connected to a hydraulic fluid circuit used to control the boom arms B, and configured such that any or certain movements of the boom arms will tend to automatically increase the fluid pressure in the fluid hose 101 up to a predetermined levels. This may be beneficial where the pressure within the fluid hose 101 tends to drop over extended periods of time, for example when a leaky seal is present.

In some embodiments, to disengage the hydraulic actuator 70, the operator will switch diverter 64, allowing the fluid line 101 to be depressurized and the hydraulic actuator 70 to be retracted, decoupling the male coupling assembly 60 and female coupling assembly 80.

What has been described is merely illustrative of the application of some embodiments of the invention. Other systems, apparatus and methods can be implemented by those skilled in the art without departing from the present invention, the scope of which is defined by the following claims.

The invention claimed is:

1. A coupling apparatus for releasably coupling a hydraulically activated work implement to a work vehicle, comprising:

(a) an implement attachment device for attaching a work implement to a work vehicle having a longitudinal vehicle axis, the implement attachment device comprising an elongate plate member extendable in a plane transverse to the longitudinal vehicle axis, the plate member having a longitudinal plate axis, a forward side for facing the work implement, and a rearward side for facing the work vehicle, first mounting members extending from the rearward side for mounting the plate member to at least one boom arm of the work vehicle, and second mounting members for mounting the plate member to the work implement;

(b) a first hydraulic coupling assembly extending from the rearward side of the plate member, the first hydraulic coupling assembly comprising a first coupler configured for fluid communication with a hydraulic power source on the work vehicle; and (c) a second hydraulic coupling assembly for mounting to the work implement, the second hydraulic coupling assembly comprising a second coupler configured for fluid communication with a hydraulic system of the work implement, the second coupler being shaped and configured for engaging the first coupler;

(d) wherein the first coupler is movable along a longitudinal axis of motion parallel to the longitudinal plate axis, between a retracted position and an extended position so as to selectively engage the first coupler with the second coupler when the work implement is attached to the implement attachment device and the second hydraulic coupling assembly is mounted to the work implement, for placing the hydraulic system of the work implement in fluid communication with the hydraulic power source;

(e) wherein the second coupling assembly is mountable to the work implement within a mounting saddle on the work implement, the mounting saddle being configured for receiving the second mounting members to mount the plate member to the work implement, and the plate member has an opening sized and located so as to receive the second coupler to allow the first coupler to selectively engage the second coupler when the work implement is attached to the plate member; and (f) wherein the first coupler is retracted away from the opening when the first coupler is in the retracted position.

2. The coupling apparatus of claim 1, wherein the first coupler comprises a first coupling block slidably connected to the plate member for movement along the longitudinal axis of motion, the first coupling block presenting a first vertically extending mating surface, and wherein the first hydraulic coupling assembly further comprises a hydraulic actuator connected to the first coupling block and the plate member for selectively moving the first coupling block between the retracted position and the extended position.

3. The coupling apparatus of claim 2, wherein the second coupler includes a second coupling block secured to a surface of the work implement facing the forward side of the implement attachment plate, the second coupling block presenting a second vertically extending mating surface, the second mating surface being sized and shaped to engage the first mating surface of the first coupling block when the first coupling block is in the extended position.

4. The coupling apparatus of claim 2, further comprising at least one male coupler extending from the first mating surface, and at least one female coupler provided in the second coupling block, the at least one female coupler sized and shaped for receiving the at least one male coupler, wherein the at least one male coupler engages the at least one female coupler to provide for fluid communication between the hydraulic system on the work implement and the hydraulic power source when the first coupling block is in the extended position.

5. The coupling apparatus of claim 3, wherein the hydraulic actuator is configured to selectively lock the first coupling block in the extended position for maintaining the engagement between the first mating surface and the second mating surface.

6. The coupling apparatus of claim 3, wherein the first coupling block comprises at least one alignment pin extending from the first mating surface, and the second coupling block has at least one bore shaped for receiving the at least one alignment pin.

7. The coupling apparatus of claim 4, wherein the at least one male coupler comprises a pair of male couplers, and the at least one female coupler comprises a pair of female couplers sized and shaped to receive the male couplers.

8. The coupling apparatus of claim 1, wherein the opening comprises an off-center cut-out extending from a top edge of the plate member.

9. The coupling apparatus of claim 2, wherein the first coupling assembly comprises a mount secured to the rearward side of the plate member, the mount presenting a slide surface having a centrally located guide slot therein, and wherein the first coupling block has a guide member shaped to fit within the guide slot.

10. A coupling apparatus for releasably coupling a hydraulically activated work implement to a work vehicle, comprising:
 (a) an implement attachment device for attaching a work implement to a work vehicle, the implement attachment device comprising a generally planar plate member having a forward side for facing the work implement, and a rearward side for facing the work vehicle, first mounting members extending from the rearward side for mounting the implement attachment device to at least one boom arm of the work vehicle, and second mounting members for mounting the implement attachment device to the work implement;
 (b) a first hydraulic coupling assembly extending from the rearward side of the implement attachment device, the first hydraulic coupling assembly comprising a first coupler configured for fluid communication with a hydraulic power source on the work vehicle; and
 (c) a second hydraulic coupling assembly for mounting to the work implement, the second hydraulic coupling assembly comprising a second coupler configured for fluid communication with a hydraulic system of the work implement, the second coupler being shaped and configured for engaging the first coupler;
 (d) wherein the first coupler is movable between a retracted position and an extended position so as to selectively engage the first coupler with the second coupler when the work implement is attached to the implement attachment device and the second hydraulic coupling assembly is mounted to the work implement, for placing the hydraulic system of the work implement in fluid communication with the hydraulic power source;
 (e) wherein the first coupler comprises a first coupling block slidably connected to the plate member, the first coupling block presenting a first mating surface, and wherein the first hydraulic coupling assembly further comprises a hydraulic actuator connected to the first coupling block and the plate member for selectively moving the first coupling block between the retracted position and the extended position;
 (f) wherein the first coupling assembly comprises a mount secured to the rearward side of the plate member, the mount presenting a slide surface having a guide slot therein, and wherein the first coupling block has a guide member shaped to fit within the guide slot; and
 (g) wherein the first coupling block comprises a L-shaped block having a first flange portion shaped to slidably move along the slide surface, and a second flange portion extending perpendicularly from the first flange portion, the second flange portion having the first mating surface.

11. A coupling apparatus for releasably coupling a hydraulically activated work implement to a work vehicle, comprising:
 (a) an implement attachment device for attaching a work implement to a work vehicle having a longitudinal vehicle axis, the implement attachment device comprising an elongate plate member extending in a plane transverse to the longitudinal vehicle axis, the plate member having a longitudinal plate axis, a forward side for facing the work implement, and a rearward side for facing the work vehicle, first mounting members extending from the rearward side for mounting the plate member to at least one boom arm of the work vehicle, and second mounting members for mounting the plate member to the work implement; and
 (b) a first hydraulic coupling assembly extending from the rearward side of the plate member, the first hydraulic coupling assembly comprising a first coupler in fluid communication with a hydraulic power source on the work vehicle;
 (c) wherein the first coupler is movable along a longitudinal axis of motion parallel to the longitudinal plate axis, between a retracted position and an extended position so as to selectively engage the first coupler with a second coupler of a second coupling assembly in fluid communication with a hydraulic system of the work implement when the work implement is attached to the implement attachment device, and thereby place the hydraulic system of the work implement in fluid communication with the hydraulic power source;
 (d) wherein the second coupling assembly is mountable to the work implement within a mounting saddle on the work implement, the mounting saddle being configured for receiving the second mounting members to mount the plate member to the work implement, and the plate member defines an opening sized and located so as to receive the second coupler to allow the first coupler to selectively engage the second coupler when the work implement is attached to the plate member; and
 (e) wherein the first coupler is retracted away from the opening when the first coupler is in the retracted position.

12. The coupling apparatus of claim 11, wherein the first coupler comprises a first coupling block slidably connected to the plate member, the first coupling block presenting a first vertically extending mating surface, and wherein the first hydraulic coupling assembly further comprises a hydraulic actuator connected to the first coupling block and the plate member for selectively moving the first coupling block between the retracted position and the extended position.

13. The coupling apparatus of claim 12, wherein the second coupler includes a second coupling block secured to a surface of the work implement facing the forward side of the implement attachment plate, the second coupling block presenting a second vertically extending mating surface, the second mating surface being sized and shaped to engage the first mating surface of the first coupling block when the first coupling block is in the extended position.

14. The coupling apparatus of claim 13, further comprising at least one male coupler extending from the first mating surface, and at least one female coupler provided in the second coupling block, the at least one female coupler sized and shaped for receiving the at least one male coupler, wherein the at least one male coupler engages the at least one female coupler to provide for fluid communication between the hydraulic system on the work implement and the hydraulic power source when the first coupling block is in the extended position.

15. The coupling apparatus of claim 9, wherein the guide member is T-shaped.

* * * * *